J. G. GRACEY.
WIND MOTOR.
APPLICATION FILED FEB. 14, 1919.
1,319,766.
Patented Oct. 28, 1919.
3 SHEETS—SHEET 1.
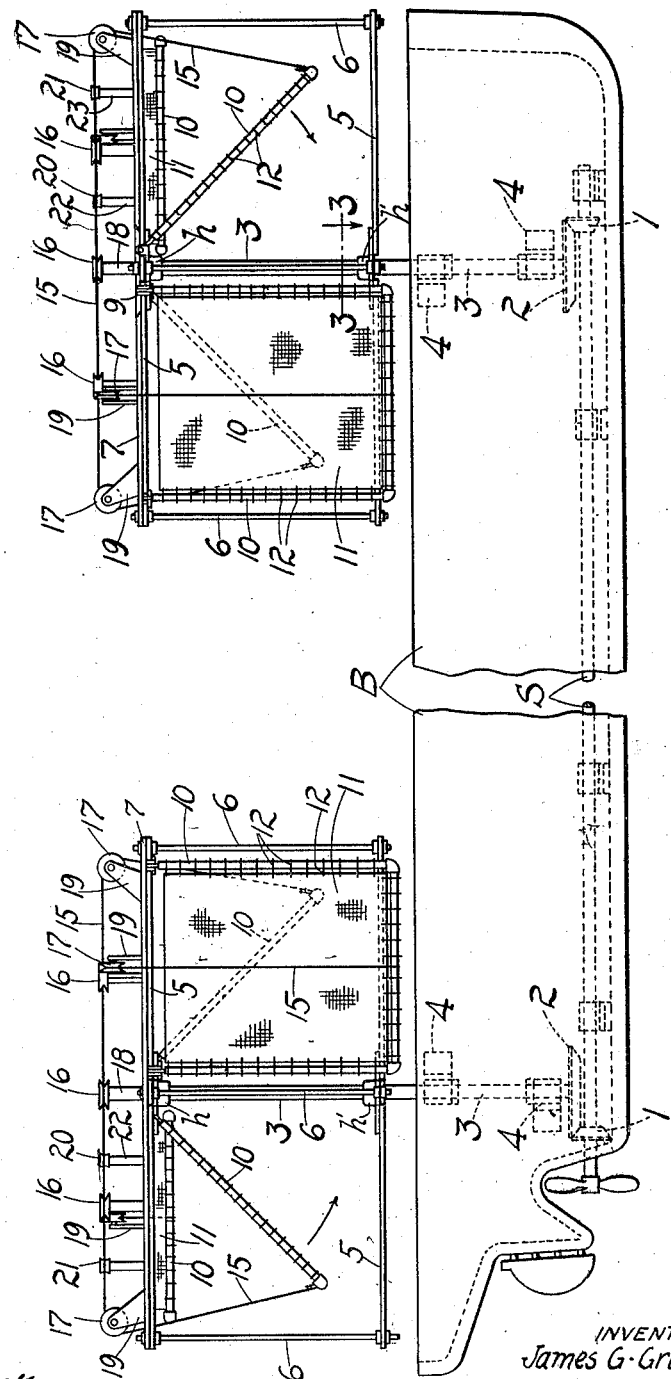
WITNESSES:
INVENTOR.
James G. Gracey.
BY Emil Starek
ATTORNEY.

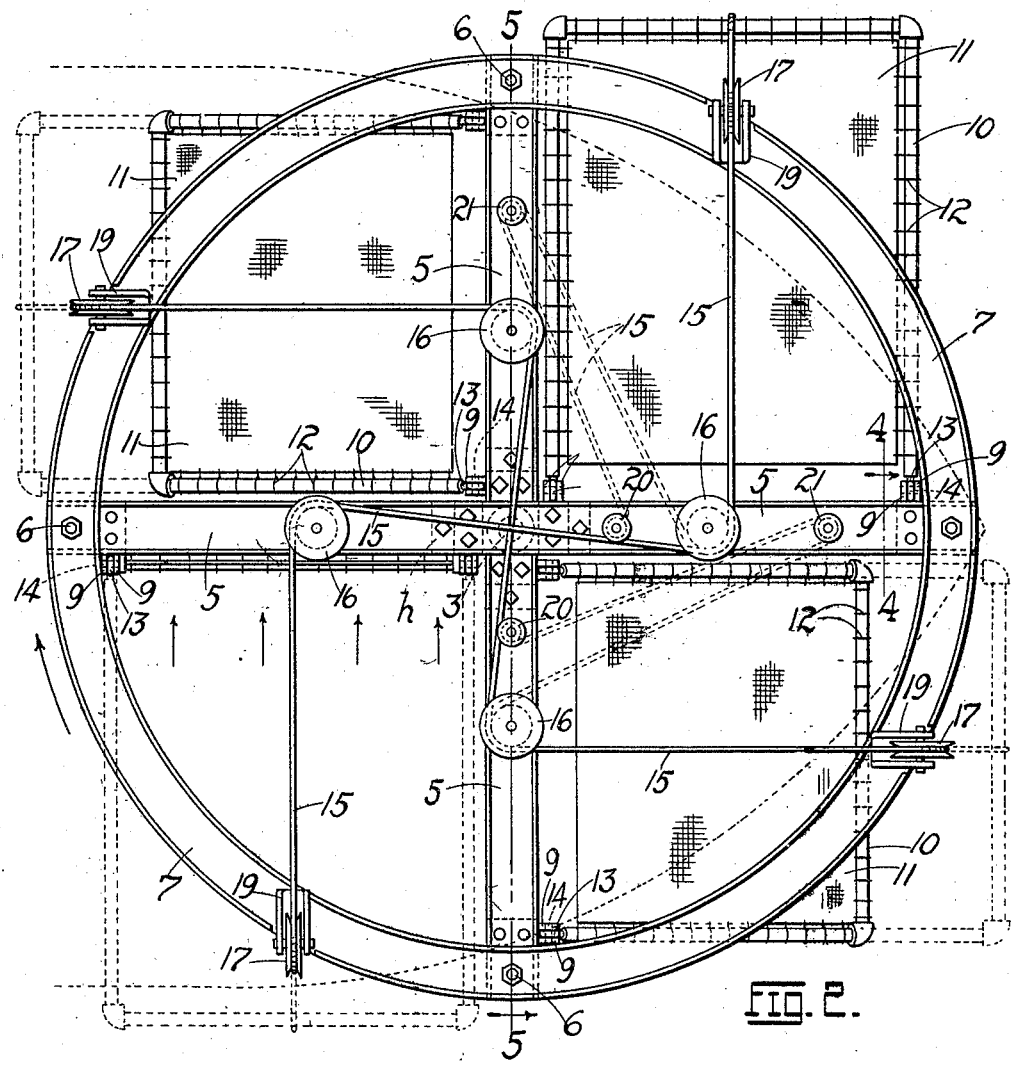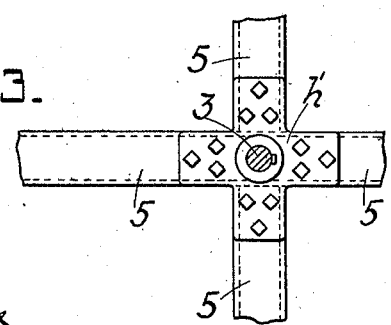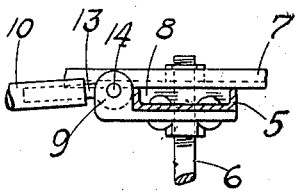

J. G. GRACEY.
WIND MOTOR.
APPLICATION FILED FEB. 14, 1919.
1,319,766.
Patented Oct. 28, 1919.
3 SHEETS—SHEET 3.
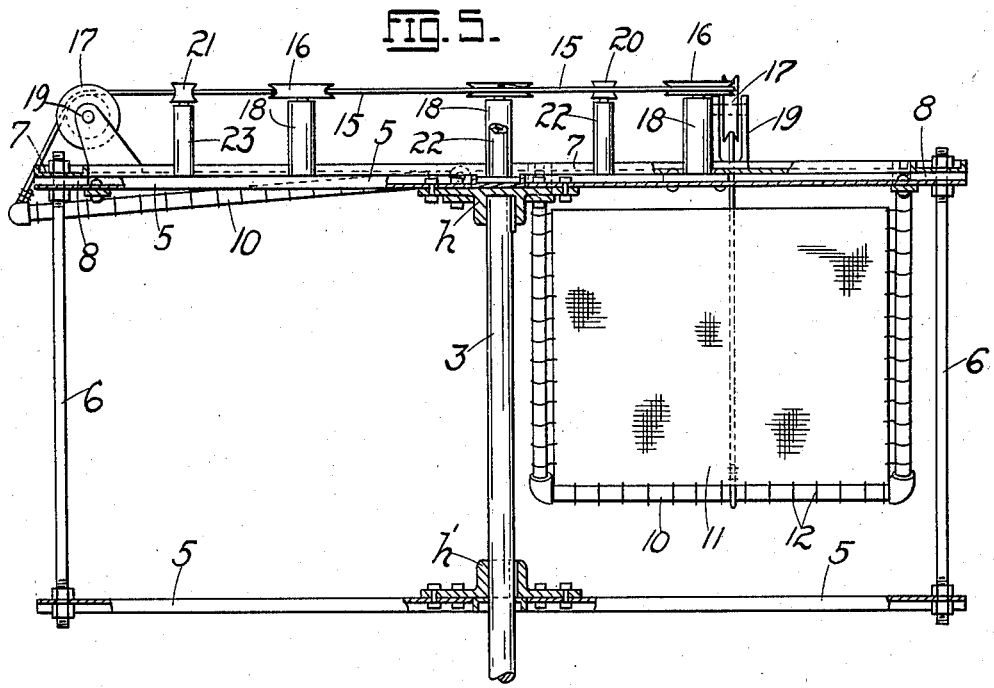
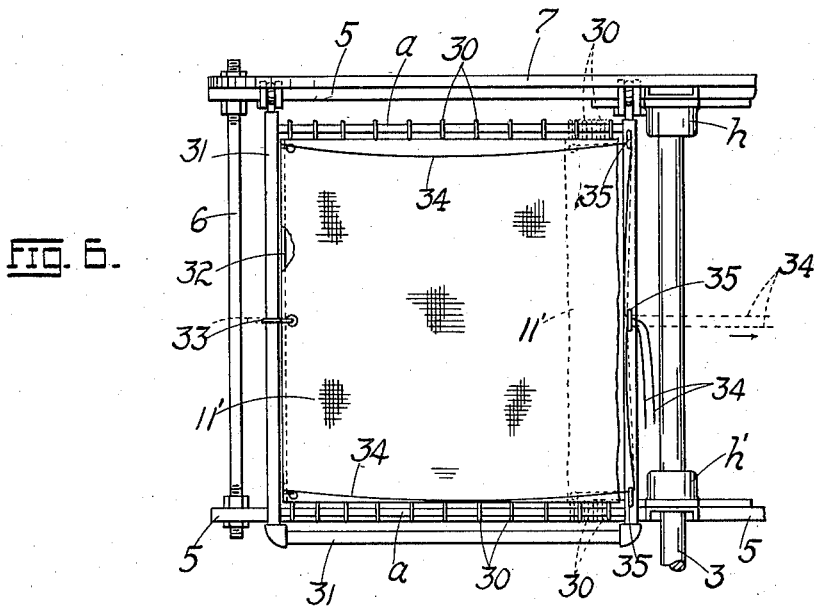
WITNESSES:
Harry A. Beimes
Else M. Surgil
INVENTOR.
James G. Gracey
BY Emil Stark
ATTORNEY.

UNITED STATES PATENT OFFICE.

JAMES G. GRACEY, OF ST. LOUIS, MISSOURI, ASSIGNOR OF ONE-HALF TO EMIL C. GANAHL, OF ST. LOUIS, MISSOURI.

WIND-MOTOR.

1,319,766.  Specification of Letters Patent. Patented Oct. 28, 1919.

Application filed February 14, 1919. Serial No. 277,067.

*To all whom it may concern:*

Be it known that I, JAMES G. GRACEY, a citizen of the United States, residing at St. Louis, State of Missouri, have invented certain new and useful Improvements in Wind-Motors, of which the following is a full, clear, and exact description, reference being had to the accompanying drawings, forming a part hereof.

The present invention is directed to improvements in wind motors and particularly those of the horizontal type or that in which the wings or sails are driven by the impulse of the wind in a horizontal plane thereby imparting rotation to a vertical shaft. The object of the invention is to provide a motor in which the surface of the sail is presented squarely to the wind whereby the full pressure or impulse of the wind is availed of to propel the sail around the axis of the vertical shaft. In the present embodiment of my invention the sails are disposed in pairs, one member of each pair receiving the impulse of the wind while the opposite or complementary member is inoperative or in feathering position, the position assumed by one member determining the position of the opposite member by reason of the controlling connection between them. The number of pairs of sails is immaterial, but in the present embodiment of the invention use is made of two pairs, the members of each pair being disposed one-hundred and eighty (180) degrees apart, the one pair being at right angles to the other pair, so that the successive sails are separated by ninety degrees. This allows for an impulse every quarter revolution of the complement of sails, or every quarter turn of the vertical shaft. The object sought of course is to construct a motor having a high efficiency, one in which the sails will respond quickly to the wind, one which is simple in construction and little likely to get out of order, one which may be put to a great variety of uses and made to serve wherever the motive power of the wind is available. The advantages of the invention will be fully apparent from the following detailed description in connection with the accompanying drawings in which—

Figure 1 represents a side elevation of a boat or launch showing my invention applied thereto; Fig. 2 is an enlarged top plan of the motor with one of the sails responding to the impulse of the wind; Fig. 3 is a horizontal sectional detail on the line 3—3 of Fig. 1; Fig. 4 is a vertical sectional detail on the line 4—4 of Fig. 2; Fig. 5 is a vertical middle section on the line 5—5 of Fig. 2; and Fig. 6 is an elevation of a frame showing a modified construction for furling the sail.

Referring to the drawings, and for the present to Figs. 1 to 5 inclusive, B, represents a conventional boat with the usual propeller shaft S as well understood in the art. Each end of the shaft S is provided with a bevel pinion 1 with which meshes the bevel gear wheel 2 at the lower end of the vertical drive-shaft 3 forming one of the elements of my improved wind-motor, said drive-shaft being supported and guided in suitable bearings 4 secured in the boat in any suitable mechanical manner. Secured to the shaft 3 above the deck of the boat is a rotor frame built up of a series of top and bottom channel bars 5 radiating respectively from the hubs $h$, $h'$, keyed or otherwise secured to the shaft, the outer ends of the members 5, 5, being connected by vertical rods 6, the whole being surmounted by an annular channel or ring 7 resting on the edges of the flanges of the upper members 5, suitable filler blocks 8 being interposed between the members 5 and 7. The rotor may of course be built up in any other suitable mechanical manner but it should always be a skeleton-like open structure so as not to offer material resistance to the wind. The members 5, 5, are ninety degrees apart, and each pair of top and bottom members 5, 5, with their terminal rod 6 may be said to constitute one of the arms or spokes of the rotor, an arm on one side of the shaft 3 being in the same vertical plane with the corresponding arm diametrically opposite thereto. Formed with, or secured to, the upper channels 5 of each rotor arm, and projecting laterally therefrom are lugs or ears 9 arranged in pairs and spaced apart, the inner pairs of lugs being disposed adjacent the rotor shaft 3, and the outer pairs at the outer terminals of the members 5, or adjacent the periphery of the rotor. As clearly shown in Fig. 2, the lugs 9 on one arm of the rotor point in a direction opposite to the corresponding lugs on the diametrically opposite arm, all the lugs however pointing tangentially in a direction opposite to the direction of rotation of the rotor as will hereinafter more clearly appear. It may be stated in passing that the rotor at the right hand end of the boat B in the present example (Fig. 1) rotates in one direction (clockwise) while that at the opposite end rotates in the opposite direction (or counter-clockwise) for the better distribution of the strains imposed by the wind acting on the wings or sails of the rotors. With the exception that one rotor is a "right" and the other a "left" both rotors are alike and a description of one will suffice for both.

Hinged to the ears or lugs 9 of the respective rotor arms are wings or sails, each wing comprising a U-shaped frame 10 composed of tubing, the same having stretched thereover a sheet of canvas 11 preferably secured by stitching 12 to the tubes, the hinged terminals of the tubes carrying eye-bolts or pins 13 looped about the hinge pins 14 supported between the ears 9, 9. Obviously, any other equivalent manner of hinging the sails or wings may be resorted to, or as may appeal to the skilled mechanic. In the present embodiment of my invention, the several wings or sails when free from the action of the wind hang suspended at an angle of substantially forty-five degrees to the vertical (or horizontal) a wing on one arm of the rotor being coupled to a wing diagonally opposite thereto on the diametrically opposite arm by means of a cable 15 the intermediate portions of which pass over the horizontal guide rollers or pulleys 16 on the rotor arms and over the vertical guide rollers or pulleys 17 on the outer ring 7 of the rotor, the ends of the cable being secured to the free cross member or tube of the wing frame. The length of the cable 15 is such that when disposed in the manner shown, the respective wings are allowed to drop to an angle of forty-five degrees, so that when one of the wings is forced to a vertical position or into a substantially vertical plane by the impulse of the wind acting upon one face thereof, its complementary wing will be lifted (by the action of the cable) into a horizontal or feathering position or plane so as to offer no resistance to its passage through the air. Obviously the cable 15 must pass around one pulley 16 on one side and around the opposite pulley on the opposite side to serve its purpose (Fig. 2). The pulleys 16 are mounted on posts 18 carried by the rotor arms, the pulleys 17 being mounted on castings or shoes 19 secured to the ring 7 of the rotor. If at any time it be desired to lift both wings or sails of any pair into a horizontal plane this may be done by taking up the portion of the cable leading from the vertical or active wing and passing it around the special idlers 20, 21, mounted respectively on posts 22 and 23 leading from the rotor. The dotted illustration in Fig. 2 shows the portion of the cable 15 referred to taken up and passed around the pulleys 20, 21, the wing immediately affected being raised to horizontal position as shown by the dotted showing at the left hand lower corner of said figure.

It will be seen from the foregoing that the wings or sails operate in pairs, a wing on one side of a rotor arm being coupled to its complementary wing on the diametrically opposite arm whereby the wings of any pair are on opposite sides of the common vertical plane through the axis of the rotor in which plane the rotor arms from which the wings are suspended, are disposed. When there is no wind acting on the wings, the latter hang at an angle of forty-five degrees as shown in the lower right hand section and upper left hand section of the rotor frame in Fig. 2; but when the wind strikes a wing, that particular wing is forced into a vertical position against the rotor arm from which it is suspended (the free end of the wing slightly overlapping the lower edge of the rotor arm, Fig. 1), the draft on the cable 15 in such vertical oscillation of said wing causing the complementary wing to be lifted into a horizontal plane (Fig. 2). The pressure of the wind against the vertically depressed wing or sail causes the rotor to rotate in the direction in which the wind pressure is exerted; and when that particular wing passes beyond the influence of the wind (which it will do as soon as the next succeeding wing presents itself to the wind in the rotation of the rotor) the tension or pull on the cable by the now released wing is relaxed, allowing said wing to be raised by the weight of the complementary wing which now drops from its horizontal position to a position of forty-five degrees to the vertical, raising the released wing to a corresponding angle, it being understood of course that the wings balance one another when they fall. In the example before us, where we have four wings or sails set ninety degrees apart there will naturally be an impulse every quarter revolution of the rotor shaft 3. In Fig. 2, and at the right hand end in Fig. 1, the wings are shown hinged on the left hand side of their respective rotor arms so that when the wind impinges against a wing or sail the rotor will rotate clockwise. In the rotor at the left hand end in Fig. 1, the wings are hinged on the right hand side of their rotor arms so that with a wind impulse the rotor will be rotated counter-clockwise, and this for the reasons previously stated. If it be desired to stop the rotor all that is necessary is to lift all the wings or sails to horizontal position, this constituting one method of "furling" the sails. I may however furl the sail in other ways. For example in Fig. 6 is shown a modification in which the canvas sheet 11' is provided with rings 30 at the top and bottom, said rings freely sliding along the rods $a, a$, of the wing frame 31. The outer edge of the canvas carries a rod 32 which by means of a swinging hook 33 hinged thereto may be coupled to the adjacent member of the frame 31. Leading from the ends of the rod 32 are cords or wires 34, guided through rings 35. When it is desired to furl the sail all that is necessary to be done is to unhook the rod 32 from the frame 31, pull on the cords 34 thereby drawing the sail inward or toward the rotor shaft 3, the rings 30 readily sliding along the rods $a, a$, as well understood in the art, this construction being common in the hanging of house curtains and tarpaulins. The construction in Fig. 6 in other respects is the same as that described in connection with Figs. 1 to 5, and corresponding parts are therefore identified by the same reference numerals.

It is apparent that the details of construction are susceptible of considerable modification without involving a departure from the nature or spirit of the invention. In the present embodiment of the invention the wings or sails (the wing frame with its sheet of canvas) return to their free or suspended normal position under the action of gravity, but I am not to be limited to gravity to restoring the wings to such normal position. The several wings here shown oscillate about horizontal axes, the wings of one pair oscillating about a common axis intersecting the axis of oscillation of the other pair (or pairs where there are more than two pairs) at the rotor axis. These horizontal axes are herein shown as disposed in a common horizontal plane, but it is obvious that I need not be limited to this specific disposition of the wings. The motor is here shown in connection with the propeller shaft of a boat B, but this is only by way of example. The motor may be coupled to any machine whatsoever.

Having described my invention what I claim is:

1. In a wind motor, a horizontally rotating rotor, vertically oscillating wings suspended therefrom on opposite sides of the rotation axis of the rotor and inclining in opposite directions from a vertical plane through the common axis of oscillation of the wings, suitable cables crossing the rotation axis of the rotor and connecting the wings, and guide rollers for the cables mounted on the rotor, the cable, with an oscillation of one of the wings into a vertical plane under the impulse of the wind operating to pull on the opposite wing and oscillate the same into a horizontal plane, the wings being alternately brought under the influence of the wind and subsequently released with each revolution of the rotor.

2. In a wind motor, a horizontally rotating rotor, vertically oscillating wings suspended therefrom on diametrically opposite sides of the rotor axis, and inclining in opposite directions from a vertical plane through the common axis of oscillation of the wings, suitable cables crossing the rotation axis of the rotor and connecting the wings, guide rollers for the cables mounted on the rotor, the cable, with an oscillation of one of the wings into driving position under the wind impulse operating to raise the opposite wing to horizontal or feathering position, and devices on the rotor for taking up the slack of the cable when both wings are raised to horizontal position.

3. A wind motor comprising a horizontally revolving rotor, a vertical shaft therefor, vertically oscillating wings or sails suspended from the rotor about the rotor axis, the said wings operating in pairs about common axes of oscillation intersecting one another at the rotor axis, the members composing any pair of wings being disposed on opposite sides of a common vertical plane through the rotor axis, and having their common axis of oscillation disposed in said plane, a cable crossing the axis of the rotor and connecting the free end of one wing with the corresponding end of a complementary wing, and suitable guide rollers or pulleys mounted on the rotor for the travel of said cable, the length of the cable being such as to allow the members of any pair of wings to drop to an inclination of forty-five degrees to the vertical, and members radiating from the axes of the rotor for arresting the wings in their angular oscillation when one of the wings of a pair has been forced by the wind to driving position.

In testimony whereof I affix my signature, in presence of two witnesses.

JAMES G. GRACEY.

Witnesses:
EMIL STAREK,
ELSE M. SIEGEL.